Patented Aug. 5, 1941

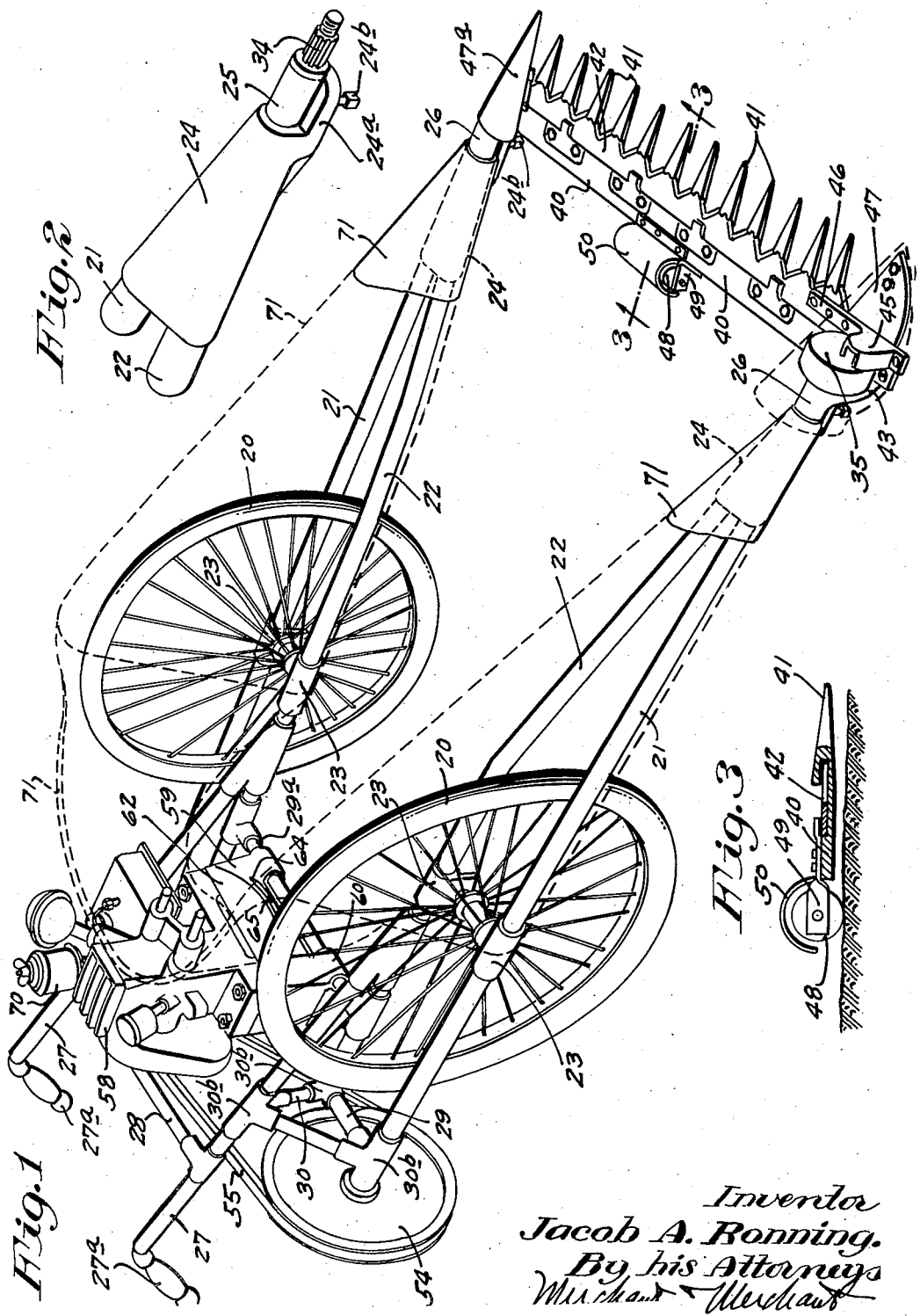

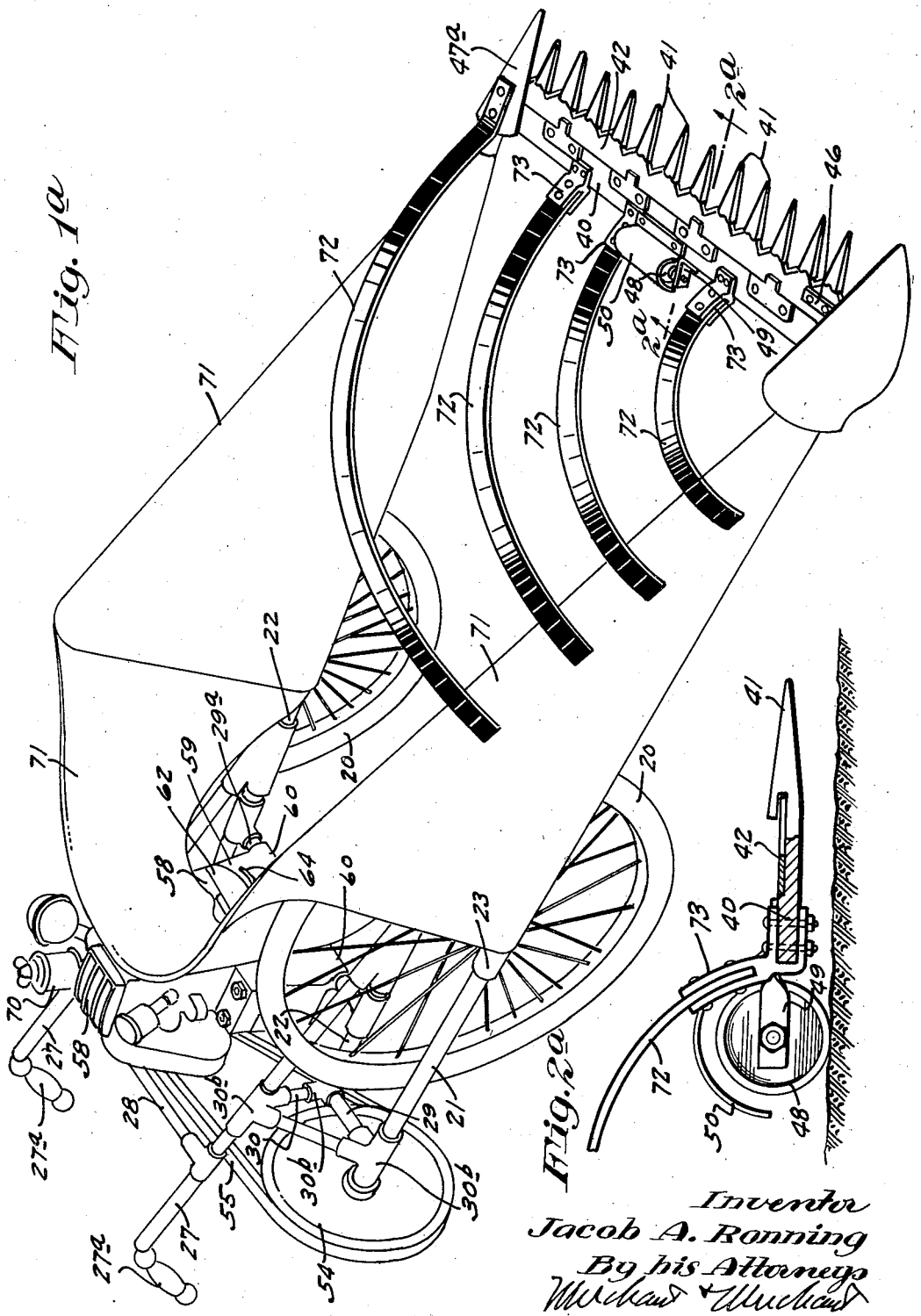

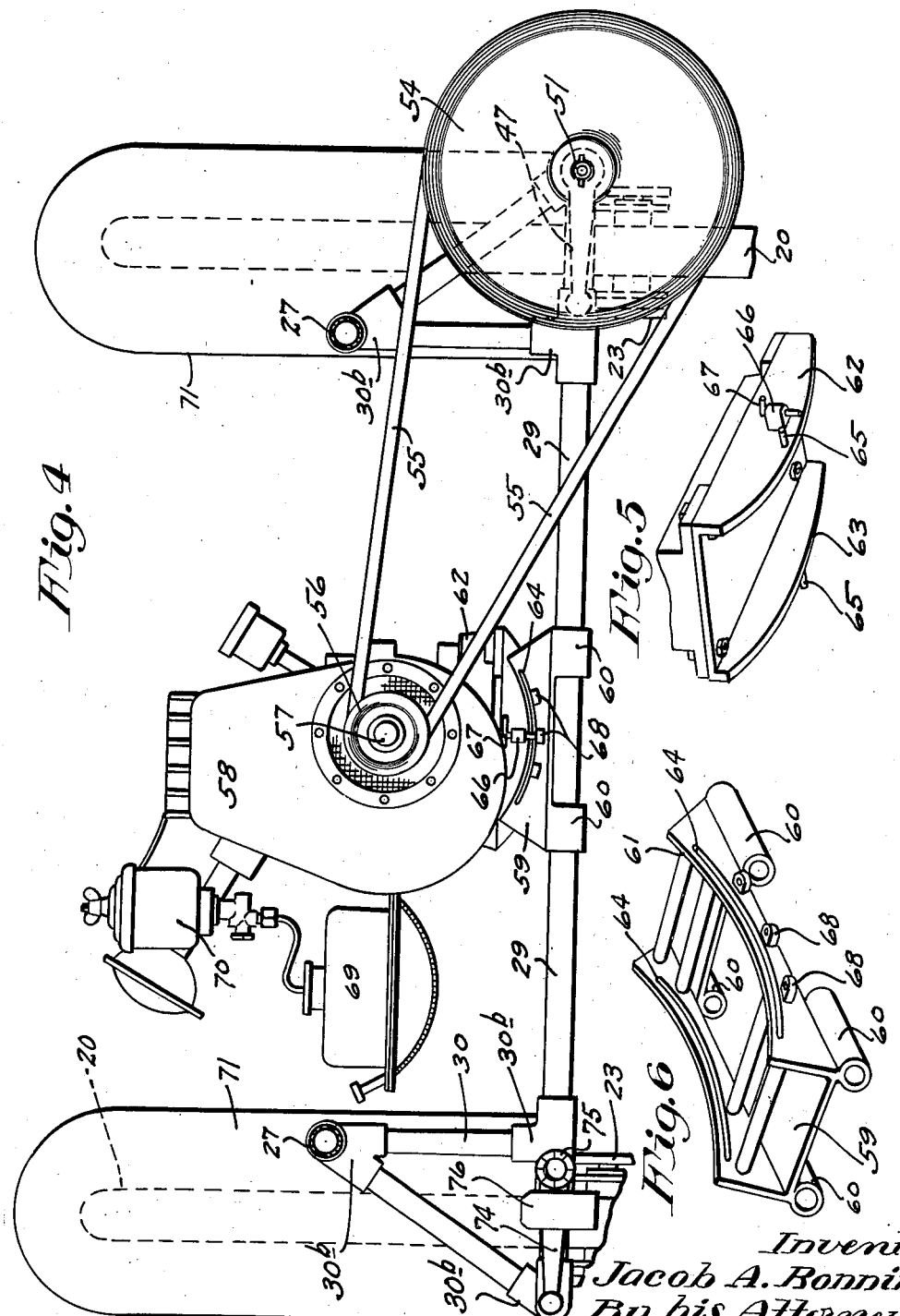

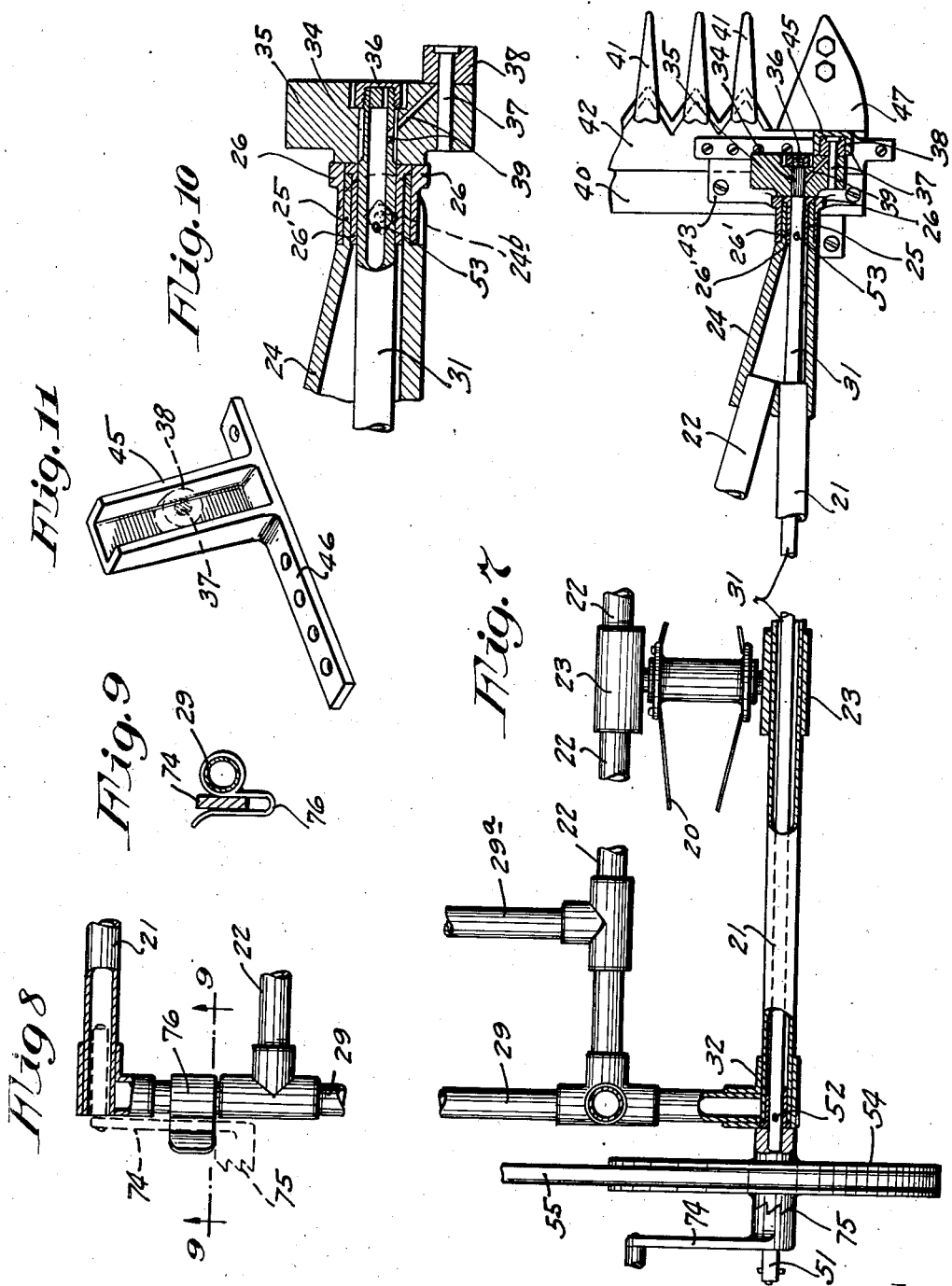

2,251,637

UNITED STATES PATENT OFFICE 2,251,637

HIGH GRASS LAWN MOWER

Jacob A. Ronning, Minneapolis, Minn.

Application August 4, 1939, Serial No. 288,358

9 Claims. (Cl. 56—26.5)

Primarily my invention provides an extremely simple and highly efficient mower of a type adapted, for example, for cutting grass that is too long to be cut by the conventional manually pushed and operated lawnmower. Long grass is found in various places, such as large lawns, golf links and certain fields where the use of large and heavy mowers is not feasible.

The invention also includes certain attachments for converting the same into various other and different uses.

The improved machine is adapted to be manually pushed forward, but is provided with a motor, preferably a small internal combustion engine, and with connections for operating the grass cutting mechanism. The grass cutting mechanism includes a reciprocating sickle and as an important feature includes a novel means for directly reciprocating the sickle from the crank of an engine driven transmission shaft.

The frame structure is made light but strong, preferably by the use of steel tubing, and this frame is intermediately mounted on wheels, with the frame, engine and cutting mechanism nearly counter-balanced on these wheels, so that the cutting mechanism may be easily guided to its work.

As an additional feature, the engine is mounted for lateral adjustments so as to shift the center of gravity and better adapt the machine for cutting on side hills and to eliminate or reduce the tendency of the machine to tip over sideways when operated on a side hill.

Referring to the drawings wherein like characters indicate like parts throughout the several views:

Fig. 1 is a perspective showing the machine designed as a mower or high grass cutter, some parts being removed to better show the frame and various other parts;

Fig. 2 is a perspective showing in detail a detachable frame extension which carries part of the sickle driving connections;

Fig. 3 is a section taken on the line 3—3 of Fig. 1;

Fig. 4 is a rear elevation of the machine with some parts removed and some parts in section;

Fig. 5 is a perspective showing the engine base;

Fig. 6 is a perspective showing a saddle for the engine base;

Fig. 7 is a fragmentary plan showing one side of the machine with various parts broken away and some parts in section;

Fig. 8 is a fragmentary detail chiefly in plan but with some parts sectioned showing the rear left-hand corner of the machine frame;

Fig. 9 is a section taken on the line 9—9 of Fig. 8;

Fig. 10 is an enlarged section of the sickle driving connections shown in Fig. 7;

Fig. 1a is a view corresponding to Fig. 1 but showing the deck and frame housing applied to the machine and also showing a windrow attachment to the machine;

Fig. 2a is a section taken on the line 2a—2a of Fig. 1a;

Fig. 11 is a perspective showing in detail the sickle bar crank head.

Attention is first called to Figs. 1 to 10 inclusive, and also to Figs. 1a and 2a. The frame of the machine is mounted on wheels 20 which are preferably light strong structures such as used on bicycles and the like and hence are preferably provided with pneumatic tires.

The machine frame involves trussed bifurcated side members made up chiefly of spaced longitudinally extended bars 21 and 22 preferably in the form of steel tubes. These tubes 21 and 22 are spaced one on each side of the cooperating wheels 20 and are provided with bearing sleeves 23, to which the hubs of the wheels 20 are journaled. At their front ends, the bars 21 and 22 are connected to a conical coupling 24, which is best shown in Figs. 7 and 10, that terminates in a sleeve 25, within which is a bushing 26′, and surrounding which is the sleeve-like portion 26 of a bracket, presently to be further considered.

At their rear portions, the frame bars 22 are provided with upwardly inclined and rearwardly extended handle bars 27 which terminate in hand grips 27a. These handle bars 27 are connected by transverse tie bar 28. The frame bars 21 and 22 at their rear ends are tied together, and the bars on the opposite sides of the machine are also cross-connected by a cross bar 29, preferably in the form of a steel tube. The handle bars 27 are tied to the rear ends of bars 21 and 22 by short diverging bars or pipe sections 30. Slightly forward of the cross tie bar 29 the frame bars 22 are tied together by a cross bar or pipe section 29a. The connections between the various pipe sections are frame bars, above described, and are made by metallic couplings or unions of well known construction generally indicated by the character 30b.

The tubular outside bars 21 are made straight and this is especially important in respect to the right-hand tubular bar 21 because that bar is used as housing and bearing for a transmission shaft 31. This shaft is directly journaled in bearing bushings 32 and 26′ mounted respectively in the rear end of tubular bar 21 and in sleeve 25 at the end of the coupling 24. This shaft 31 is utilized as an oil conductor and, hence, is made tubular. At its front end it projects and is formed with ribs 34 that fit corresponding internal grooves in a crank disc 35. On the threaded extreme front end of shaft 31 is a cap nut 36 that closes the passage in said shaft and clamps the crank disc shaft against axial displacement.

Crank disc 35 is provided with a wrist pin 37 that is equipped with a roller 38. An oil duct 39 leads from the interior of the tubular shaft 31 obliquely through the crank disc 35 and delivers oil to the wrist pin 37 and roller 38.

The grass cutting mechanism includes as its main elements a finger bar and reciprocating sickle bar much of the type used in mowers but of lighter weight than generally employed. The finger bar 40 is provided with projecting fingers or teeth 41, and the blade-equipped sickle bar 42 is mounted to reciprocate on said finger bar with its blade working through passages in the fingers 41. To support the finger bar from the frame, it is provided at its ends with rigidly secured brackets 43 that are provided with collars 26 mounted on the sleeves 25 of the couplings 24. The roller 38 of the wrist pin 37 works in a vertical slot of a thrust head 45, the base of which is in the form of a bar 46 that is riveted or otherwise rigidly secured to the sickle bar 42. The face of this thrust head 45 is slightly inclined in respect to the ground so that it is parallel to the face of the crank disc 35. This direct drive between the crank shaft and the sickle bar is considered a highly important and novel feature which will be further discussed in the description of the operation.

The finger bar at one end, under the thrust head 45, is shown as provided with a ground-engaging shoe 47. Also, as shown, at the opposite end of the sickle bar is a shoe 47a. The finger bar is preferably further supported at a slight distance above the ground by means of a ground-engaging roller 48 journaled to bearing brackets 49 secured on the finger bar. The numeral 50 indicates a shield secured to the finger bar and which overlies the roller 48.

The tubular transmission shaft 31 at its rear end is provided with a grease or oil receiving coupling 51 preferably of the well known Alemite type so that grease may be forced into said tubular shaft. This shaft is provided with small oil discharge passages 52 and 53 that deliver respectively to the bearing bushings 32 and 26'.

Secured on the rear portion of shaft 31 is a transmission element shown as in the form of a grooved pulley 54, which is engine driven, as will presently appear, through a belt 55. The driving belt 55 is driven from a drive pulley 56 on the crank shaft 57 of a motor preferably in the form of an internal combustion engine, the frame of which is indicated as an entirety by the numeral 58.

The engine is mounted to oscillate on the axis of its crank shaft 57, and is mounted on a concave saddle indicated quite generally in the drawings and shown in detail in Fig. 6 wherein the saddle is indicated as an entirety by the numeral 59. This saddle, in the structure illustrated, has tubular portions 60 through which the cross tie bars 29 and 29a are passed. The front and rear flanges of this saddle are formed with concave bearing surfaces 61 that are on the arc of a circle, the axis of which is co-incident with the axis of the engine crank shaft 57. The frame of the engine is shown as mounted on a base 62, shown in detail in Fig. 5, which has convex flanges 63 that fit and engage the concave flanges 61 of the saddle.

The means for laterally shifting the engine and its center of gravity and for locking it in different adjustments may be varied, but as shown, the flanges of the saddle 61 are provided with curved slots 64 in which pins or projections 65, on the engine base 62, work to prevent rising of the engine from the saddle. To lock the engine at its different adjustments, the base 62 is shown as provided with a lug 66 through which vertically works a lock pin 67 that is engageable with any one of several perforated lock lugs 68 on the side of the saddle.

It will be noted that the center of gravity of the engine and the parts supported thereby are offset to the left in respect to Fig. 4 from the axis of the engine crank shaft. Of course, the means for supplying the engine with gasoline or other fluid may be varied. However, as shown in Fig. 4, the numeral 69 indicates a gasoline tank that delivers gasoline to the engine through the conventional or any other suitable carburetor 70.

In the commercial machine, the wheels and the side frame members 21 and 22 are preferably covered by light sheet metal shields 71 that are suitably secured to the side frame members. In the machine designed for the cutting of grass, a space between the side frames, wheels and shields, is open so that the cut grass will fall at the rear of the sickle bar.

By reference to Figs. 1 and 2, it will be noted that the front ends of the couplings 24, under their sleeves 25, are provided with projecting flanges 24a through which work set screws 24b which, when tightened, clamp the collars 44 on to the respective sleeves 25. When the set screws 24b are unscrewed, and the cap nut 36 (see particularly Fig. 10) is removed, the entire cutting mechanism including the finger bar, sickle and crank disc 35 can be moved forwardly and, therefore, entirely disconnected from the frame mechanism.

Figs. 1a and 2a show curved deflecting deck-forming bars for application to the machine designed as a mower. These curved bars 72 are shown as attached to the back of the finger bar by means of coupling brackets 73. One of the said bars 72 is shown as directly bolted to the shoe 47a. The purpose of these curved deck-forming bars is to cause cut grass such as alfalfa to be delivered at one side of the machine in the form of a windrow.

In Figs. 7 and 8 there is shown an engine starting crank 74 which is slipped on to the rear end of the shaft 31 and has a ratchet-like engagement at 75 with the hub of the pulley 54. When this crank is used to rotate the pulley 54, the crank shaft of the engine will, of course, be rotated and the engine started providing the ignition of the engine is set for firing. In Figs. 8 and 9 this crank, while out of use, is shown as held by a prong spring clamp 76 applied to one end of the cross bar 29.

Ignoring now the attachment shown in Figs. 1a and 2a and directing attention to the mower illustrated in Figs. 1 to 10 inclusive, it will be noted that the weight of the engine and the other parts on the frame at the rear of the wheel axes, is nearly but not quite great enough to lift the front end of the frame and the grass cutter or mower. This makes the machine easy to handle and by a very light pressure on the handle bars to raise the cutting mechanism off of the ground when moving the machine from place to place while out of cutting action. Of course, the engine affords all of the power for driving the cutting mechanism, leaving only the machine to be pushed ahead by the operator.

The arrangement of the sickle driving mechanism, particularly that portion that forms the connection between the driving shaft and the sickle bar, is thought to be novel and highly important for several reasons. In the first place, it eliminates the use of a pitman or connecting rod and brings the driving element close down to the sickle bar. In the second place, it drives the sickle by a direct thrusting action of the wrist pin of the crank disc or thrust head. The friction is reduced to a minimum by providing the wrist pin with a roller which works upwardly and downwardly in the groove or slot of the thrust head of the sickle bar. The cutting action is, therefore, produced by direct thrusting action of the wrist pin of the crank disc on the sickle bar.

By making the driving shaft tubular, it is arranged to keep the bearings therefor and the bearing for the roller on the wrist pin always well lubricated.

When the mower is to be used on a side hill, move transversely of the incline thereof, and it is desirable to shift the center of gravity of the engine toward the high side, this may be readily done with the engine mounted on the saddle as described.

What I claim is:

1. In a machine of the kind described, laterally spaced wheels, laterally spaced side frames including inside and outside frame bars that embrace said wheels and to the intermediate portions of which said wheels are journaled, couplings uniting the front end of the corresponding inside and outside frame bars, cutting mechanism connected to and supported from said bar couplings, means connecting the inner and outer frame bars and cross connecting the bars of the two side frames, and an engine mounted on the rear portions of said side frames and having driving connections for operating said cutting mechanism, and handle bars connected to and projecting rearward from said side frames, said inside and outside bars and their respective handle bars being connected by a triangular arrangement of short coupling bars.

2. In a machine of the kind described, laterally spaced wheels, laterally spaced side frames including inside and outside frame bars that embrace said wheels, and to the intermediate portions of which said wheels are journaled, couplings uniting the front ends of the corresponding inside and outside frame bars, a finger bar secured to and supported from said couplings, a sickle bar mounted to reciprocate on said finger bar and provided with a slotted thrust head, means connecting the inner and outer frame bars and cross connecting the bars of the two side frames at the rear of said wheels, an engine mounted on the rear portions of said side frames, and transmission mechanism driven from said engine, in a continuous rotary direction and including a transmission shaft provided with a crank head having a wrist pin working in the slot of the thrust head of said sickle bar.

3. The structure defined in claim 2 in which one of the frame bars is straight and tubular and through which said transmission shaft is extended to said crank head.

4. In a machine of the kind described, laterally spaced wheels, laterally spaced side frames to the intermediate portions of which said wheels are journaled, couplings applied to the front ends of said side frames and terminating in sleeves, a finger bar provided with coupling brackets with collars telescoped on to the sleeves of said couplings and rigidly but detachably secured thereon, a sickle bar mounted to reciprocate on said finger bar and provided with a slotted thrust head, cross connections uniting the rear ends of said side frames at the rear of said wheels, an engine mounted on said cross connections at the rear of said wheels, one of said side frames having a straight tubular member, transmission mechanism driven from said engine and including a continuous direction rotary transmission shaft that is provided at one end with a crank head having a wrist pin working in the slot of the thrust head of said sickle bar.

5. The structure defined in claim 2 in which said transmission shaft is tubular and adapted to contain grease and is provided with discharge ports for the lubrication of the bearings, shaft and wrist pin.

6. The structure defined in claim 2 in which said engine is mounted for adjustments transversely of the machine.

7. The structure defined in claim 2 in which said frame work is provided at the rear of the wheels with a concave saddle, and said engine is mounted with a convex base engageable with the convex surface of said saddle and mounted for adjustments transversely of the machine.

8. In a machine of the kind described, laterally spaced wheels, laterally spaced side frames including inside and outside frame bars that embrace said wheels, and to the intermediate portions of which, said wheels are journaled, couplings uniting the front end of the corresponding inside and outside frame bars, cutting mechanism connected to and supported from said bar couplings, means connecting the inner and outer frame bars and cross connecting the bars of the two side frames, and an engine mounted on the rear portions of said side frames and having driving connections for operating said cutting mechanism, and which cutting mechanism includes a finger bar and a reciprocating sickle mounted thereon, said finger bar being directly and rigidly secured to said couplings, one of said frame bars being straight and tubular, and said driving connections including a constant direction transmission shaft extended through and journaled in said tubular frame bar.

9. In a machine of the kind described, laterally spaced wheels, laterally spaced side frames including inside and outside frame bars that embrace said wheels, and to the intermediate portions of which, said wheels are journaled, couplings uniting the front end of the corresponding inside and outside frame bars, cutting mechanism connected to and supported from said bar couplings, means connecting the inner and outer frame bars and cross connecting the bars of the two side frames, and an engine mounted on the rear portions of said side frames and having driving connections for operating said cutting mechanism, and which cutting mechanism includes a finger bar and a reciprocating sickle mounted thereon, said finger bar being directly secured to said couplings, one of said frame bars being straight and tubular, and said driving connections including a constant direction tubular transmission shaft extended through and journaled in said tubular frame bar, and which tubular shaft is adapted to contain a lubricant and has means for the introduction of lubricating material into the same for lubricating the bearing associated therewith.

JACOB A. RONNING.